(12) United States Patent
Sharma et al.

(10) Patent No.: US 7,421,658 B1
(45) Date of Patent: Sep. 2, 2008

(54) METHOD AND SYSTEM FOR PROVIDING A GRAPHICAL USER INTERFACE FOR A SCRIPT SESSION

(75) Inventors: Vivek Sharma, Fremont, CA (US); Srinivasu Gottipati, Santa Clara, CA (US); Sundeep Nayak, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 854 days.

(21) Appl. No.: 10/631,339

(22) Filed: Jul. 30, 2003

(51) Int. Cl.
G06F 3/00 (2006.01)
G06F 9/44 (2006.01)

(52) U.S. Cl. .................... 715/744; 715/749; 715/733; 715/762

(58) Field of Classification Search .......... 715/700, 715/733, 744, 762, 764, 780, 810; 717/114, 717/115, 140, 143
See application file for complete search history.

(56) References Cited

U.S. PATENT DOCUMENTS

| | | | | |
|---|---|---|---|---|
| 5,228,123 A * | 7/1993 | Heckel | ...................... | 715/762 |
| 5,542,024 A * | 7/1996 | Balint et al. | ................ | 715/853 |
| 6,078,322 A * | 6/2000 | Simonoff et al. | ............ | 715/744 |
| 6,195,676 B1 * | 2/2001 | Spix et al. | ..................... | 718/107 |
| 6,408,429 B1 * | 6/2002 | Marrion et al. | ............. | 717/100 |
| 6,539,538 B1 * | 3/2003 | Brewster et al. | ............ | 717/115 |
| 6,600,498 B1 * | 7/2003 | Chow | ......................... | 715/769 |
| 6,975,712 B1 * | 12/2005 | Schnarel et al. | ........ | 379/142.01 |
| 7,007,266 B1 * | 2/2006 | Isaacson | ...................... | 717/100 |
| 7,155,706 B2 * | 12/2006 | Snover et al. | ............... | 717/143 |
| 7,176,949 B1 * | 2/2007 | Moser | ......................... | 715/705 |
| 7,284,234 B2 * | 10/2007 | Steg et al. | .................... | 717/113 |
| 2002/0070968 A1 * | 6/2002 | Austin et al. | ................ | 345/764 |
| 2002/0156984 A1 * | 10/2002 | Padovano | .................... | 711/148 |
| 2002/0183051 A1 * | 12/2002 | Poor et al. | .................. | 455/418 |
| 2003/0156132 A1 * | 8/2003 | Gn et al. | ...................... | 345/740 |
| 2003/0210275 A1 * | 11/2003 | Draschwandtner et al. | .. | 345/810 |
| 2003/0237050 A1 * | 12/2003 | Davidov et al. | ............. | 715/513 |
| 2004/0163090 A1 * | 8/2004 | Ledru et al. | ................. | 719/320 |
| 2004/0255269 A1 * | 12/2004 | Santori et al. | ............... | 717/109 |
| 2005/0021652 A1 * | 1/2005 | McCormack | ............... | 709/207 |

OTHER PUBLICATIONS

M. E. Zander, "Imagetool: image processing on the sun workstation", 1991, Journal: Proceedings of the SPIE—The International Society for Optical Engineering, vol. 1567, p. 9-14.*

Jagannadham V. Jonnalagadda, "Design and Implementation of an Improved Remote User Query System", 1996, Corporate Source/Institution: University of Nevada, Reno, vol. 35/03 of Masters Abstracts, p. 839, 85 pages.*

* cited by examiner

Primary Examiner—X. L Bautista (57) ABSTRACT

Embodiments of the present invention comprise a system and method of providing a graphic user interface (GUI) for scripts. The system comprises one or more scripts, a script GUI module and an interface unit. The script GUI module establishes and maintains communication channels between an executing script and the interface unit. The script GUI module receives information from the executing script and determines if the information comprises an input type command. If the information comprises an input type command, the script GUI module generates an appropriate input mechanism as a function of said input type command.

30 Claims, 8 Drawing Sheets

```
#!/bin/sh
prompt()
{
  eval $2=
  until eval [ x"$"$2 != x ] ; do echo $1 ; eval read $2 ; done
}
echo "Discovering currently installed instances on machine"
echo "This may take a while......"
sleep 2
echo "Still Searching....."
sleep 2
echo "Discovered following instances: tboli, igold, sboli"                    610 prompt "<PROMPT>Enter comma separated list of volume groups: " val2
sleep 2
                                                                              620 prompt "<PROMPT>Do you want to schedule this job for
later?<OPTIONS>Yes,No</OPTIONS>" later if [ "$later"x = "Yes"x ]
then
    prompt "<PROMPT>What time should clone start" the_time
fi echo ""
```

METHOD AND SYSTEM FOR PROVIDING A GRAPHICAL USER INTERFACE FOR A SCRIPT SESSION

FIELD OF THE INVENTION

Embodiments of the present invention relate to script session, and more particularly to providing a graphic user interface for a script session.

BACKGROUND OF THE INVENTION

Figure 1:
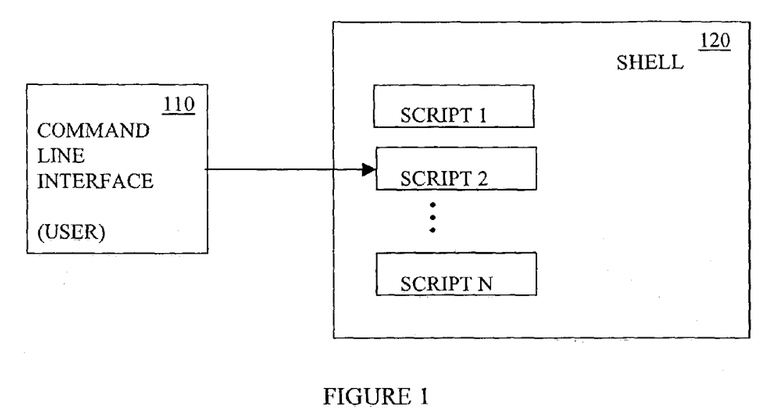
FIG. 1 shows a block diagram of a system executing scripts in accordance with the prior art.

Referring to FIG. 1, a block diagram of a system executing scripts in accordance with the prior art is shown. As depicted in FIG. 1, the system comprises a command line interface 110 and one or more scripts 131-135. The scripts 131-135 typically execute within a shell 120. The shell 120 comprises a layer of programming that understands and executes the commands. Each script 131-135 comprises a plurality of commands that are pre-stored in a file and performed by a command interpreter whenever the script name and/or location is entered. The command line interface 110 displays any information received from an executing script 133 that comprises a display type command (e.g., echo). The command line interface 110 also sends any information entered by a user to the executing shell 133.

Figure 2:
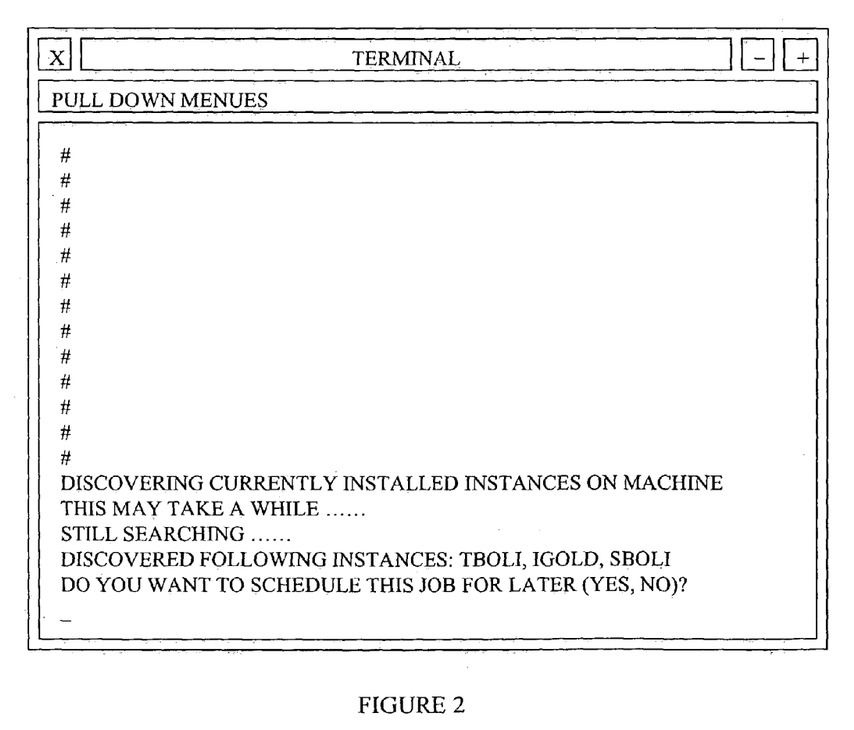
FIG. 2 shows an exemplary command line interface generated during execution of a given script according to the prior art.

Accordingly, scripts in a Unix environment, and many other platforms, do not have a graphic user interface (GUI). Referring now to FIG. 2, exemplary command line interface generated during execution of a given script according to the prior art is shown. As depicted in FIG. 2, the exemplary command line interface is not readily understood by a computer user who is unfamiliar with executing shell scripts. If a GUI is desired, a custom GUI needs to be built for each script. Hence, the need to build a custom GUI for a script can be expensive and time-consuming.

SUMMARY OF THE INVENTION

Embodiments of the present invention comprise a system and method of providing a graphic user interface (GUI) for scripts. In one embodiment, the system is implemented as a computing device comprising one or more scripts, a script GUI module and an interface unit. The script GUI module is communicatively coupled between an executing script and the interface unit. The script GUI module establishes and maintains communication channels between an executing script and the interface unit. The script GUI module receives information from the executing script and determines if the information comprises an input type command. If the information comprises an input type command, the script GUI module generates an appropriate input mechanism as a function of said input type command.

In another embodiment, the method of generating a GUI for a script session comprises receiving information from an executing script. The method further comprises parsing the information to determine if the information contains an input type command. In one implementation, parsing the information comprises detecting the presence of a tag identifying an input type command. A graphical user interface comprising an input prompt is generated, if the information contains an input command.

Accordingly, embodiments of the present invention advantageously pass information utilizing a GUI between the user and the script that otherwise does not have one. Embodiments of the present invention also advantageously provide a GUI for shell scripts with minimal or no modification to the scripts. Embodiments of the present invention also advantageously provide a GUI for scripts without the need for re-generating, re-compiling or other tasks for each script.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 3:
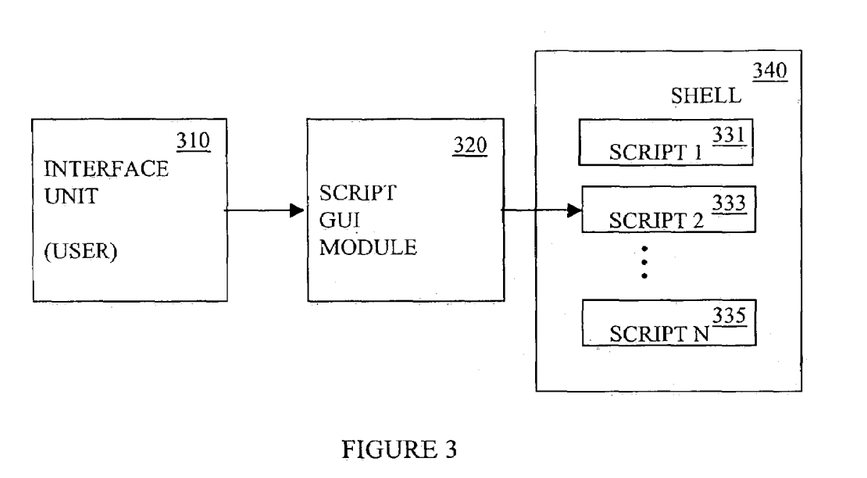
FIG. 3 shows a block diagram of a system for generating a GUI for a script session, in accordance with one embodiment of the present invention.

Embodiments of the present invention comprise a system and method of providing a graphic user interface (GUI) for scripts. Referring now to FIG. 3, a block diagram of a system for generating a GUI for a script session, in accordance with one embodiment of the present invention, is shown. As depicted in FIG. 3, the system comprises an interface unit 310, a script GUI module 320 and one or more scripts 331-335 and/or tools (hereinafter referred to as scripts). The script GUI module 320 is communicatively coupled between the one or more scripts 331-335 and the interface unit 310. The interface unit 310 comprises a device independent graphics enabled interface, such as a browser, custom java application or the like.

Each script 331-335 comprises a plurality of commands that are pre-stored in a file and performed by a command interpreter whenever the script name and/or location is entered. In one implementation the commands comprise operating system commands. In another implementation, the commands comprise interpreted programming language commands. The scripts 331-335 typically execute within a shell 340. The shell 340 comprises a layer of programming that understands and executes the commands.

The script GUI module 320, a middle-tier program, acts as a gateway/interface between the interface unit 310 (e.g., end user) and a particular script 333 that the user is invoking. The script GUI module 320 receives communications from the interface unit 310 to the script 333, and also from the script 333 to the interface unit 310. If the script 333 is writing some information, that information is displayed on the interface unit 310 in a GUI. If the script 333 is asking for user input, the script GUI module 320 presents the question along with an input mechanism in which the user can specify or select an input. Depending upon the types of input requested, the script GUI module 320 may present different types of input mechanisms. The input mechanisms may include, but are not limited to, a text box or a select list.

Accordingly, the script GUI module 320 enables the interface unit 310. The script GUI module also invokes execution of the given script 333. The script GUI module also establishes and manages communication between the interface unit 310 and itself 320, and between itself and the script 333. The script GUI module 320 also parses the information received from the script 333 to determine an input command. The script GUI module also parses the information received from the interface unit 310 to determine an input from the user.

The system for generating a GUI for a script session may be implemented as a client application running on a computing device such as a personal computer, server, a personal digital assistant, or the like. The system for generating a GUI for a script session may also be implemented as a client application being accessed over a network. In a network implementation, the interface unit 310 may be running on a first computing device and the script GUI module 320, the one or more scripts 331-335 and the shell 340 may be running on a second computing device.

Figure 4A:
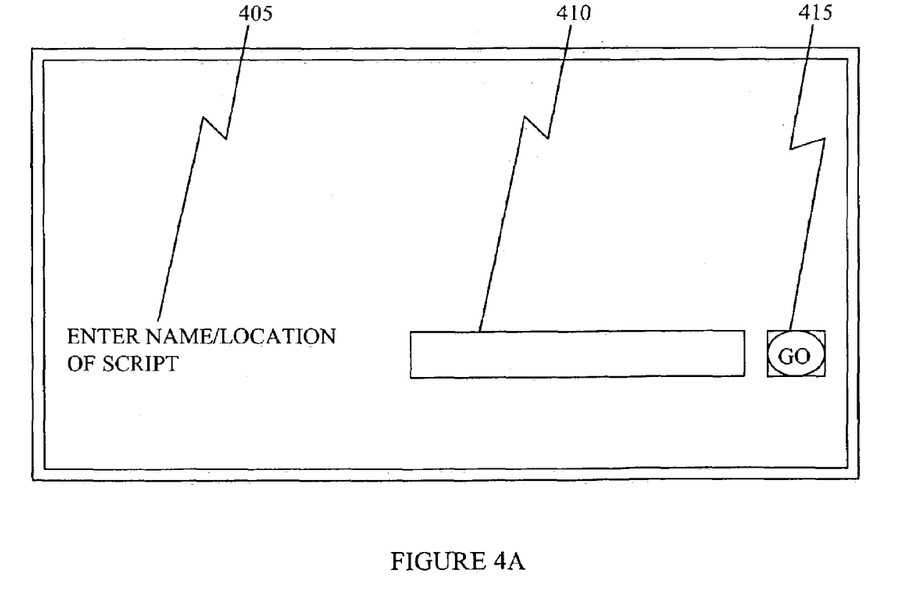
FIGS. 4A, 4B and 4C show exemplary GUIs generated during execution of a given script, in accordance with one embodiment of the present invention.
Figure 4B:
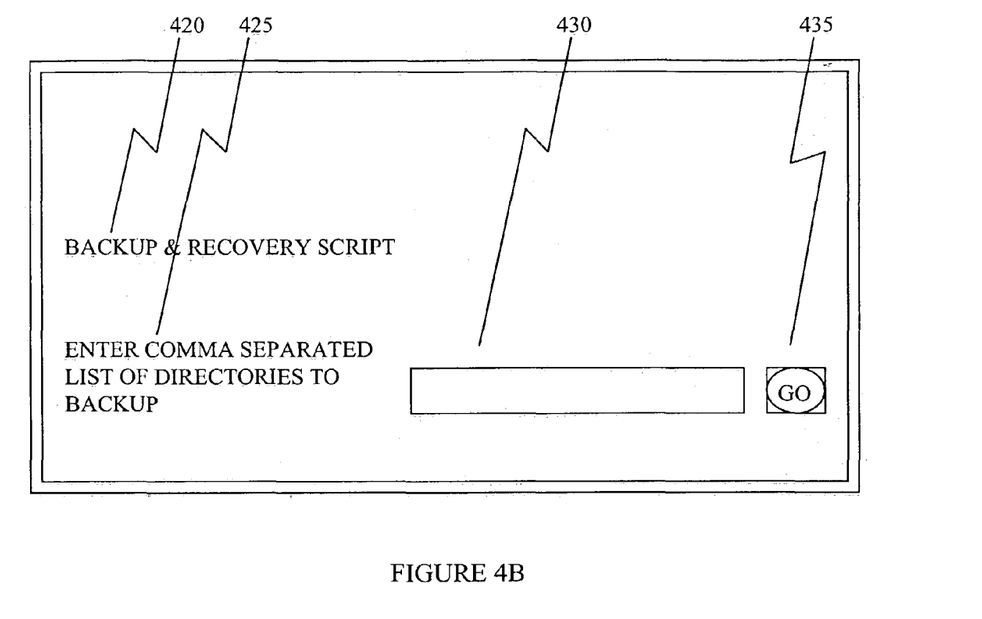
Figure 4C:
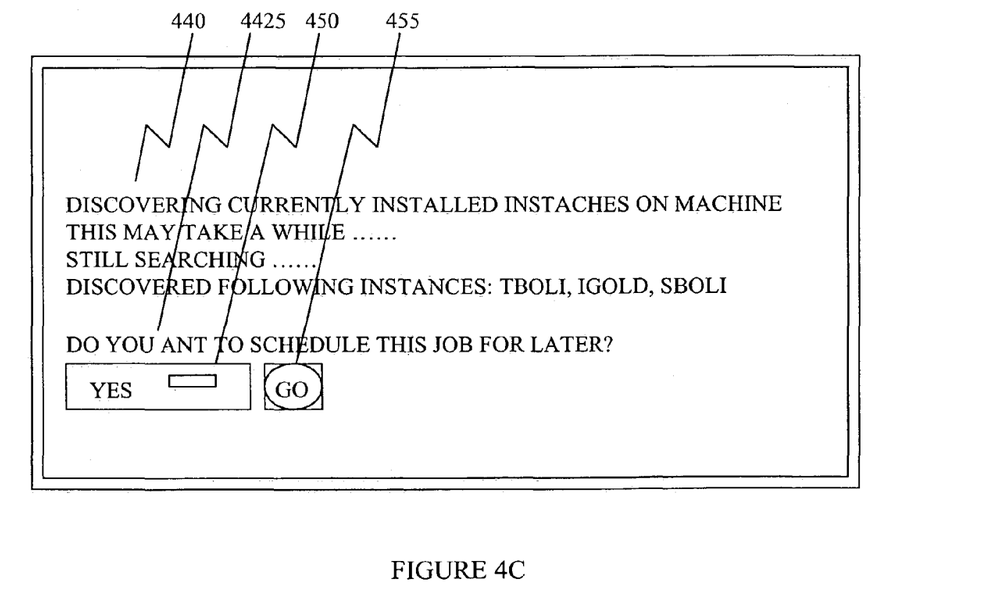

Referring now to FIGS. 4A, 4B and 4C, exemplary GUIs generated during execution of a given script, in accordance with one embodiment of the present invention, are shown. As depicted in FIG. 4A, the exemplary GUI presents a question 405 and an input mechanism 410, 415 wherein a user enters a path of the script that user wants to invoke. Upon specification of the name and/or address of the script, the script GUI module invokes execution of the specified script.

Assuming that the invoked script comprises a free-text type input command, the script GUI module receives and parses information received from the script. The script GUI module generates a GUI comprising an applicable free-text prompt. As depicted in FIG. 4B, an exemplary GUI comprises one or more character string 420, 425 and an input mechanism 430, 435. The input mechanism may comprise a text box 430 and a means for sending the specified input value 435 to the script GUI module.

Assuming that the invoked script comprises an option type input command, the script GUI module receives and parses information received from the script. The script GUI module generates a GUI comprising an applicable option prompt. As depicted in FIG. 4C, an exemplary GUI comprises one or more character strings 440, 445 and an input mechanism 450, 455. The input mechanism may comprise a selection box 450 and a means for sending the selected input value 455 to the script GUI module.

Figure 5:
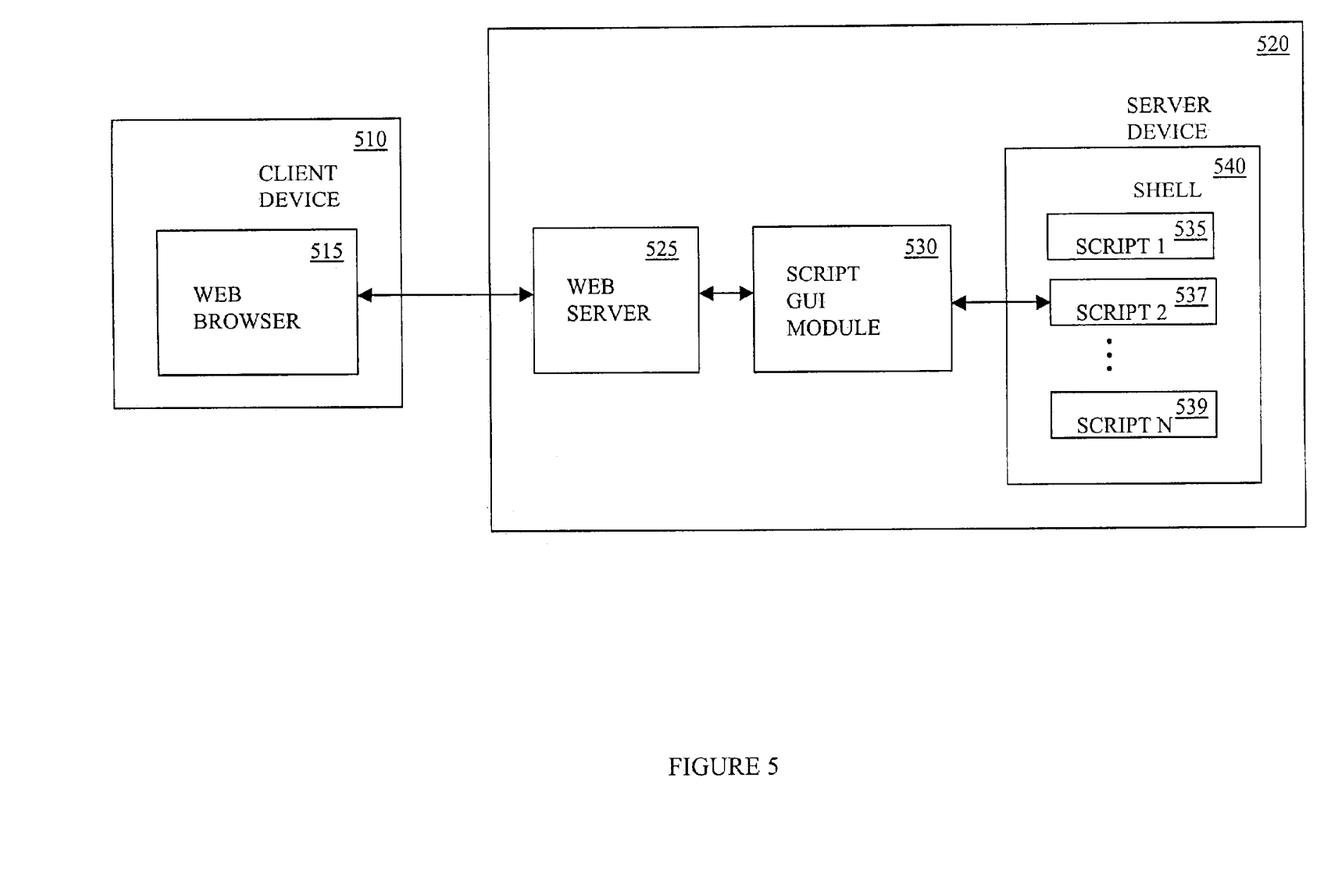
FIG. 5 shows a block diagram of a system for generating a GUI for a script session, in accordance with another embodiment of the present invention.

Referring now to FIG. 5, a block diagram of a system for generating a GUI for a script session, in accordance with another embodiment of the present invention, is shown. The GUI allows a user to monitor execution of the script, control execution of the script, and interact with the script and/or the like. As depicted in FIG. 5, the system comprises a client device 510 (e.g., user) communicatively coupled to a server device 520. The client device 510 comprises a web browser 515 or other similar computer graphics interface. The server device 520 comprises a web server 525 or other similar network server, a script GUI module 530 and one or more scripts 535-539. The script GUI module 530 is coupled between the web browser 525 and the one or more scripts 535-539.

The script GUI module 530 acts as a gateway/interface between the web server 525 and a given script 537 invoked by the user (e.g., client device 510). More specifically, the script GUI module 530 is utilized to launch a given script 537 specified by the user via the web browser 515. The script GUI module 530 establishes and manages communications between the web server 525 and itself 530, and between itself 530 and the script 537. The script GUI module 530 generates web pages as a function of information received from the script 537. The script GUI module 530 sends one or more web pages to the web server 525. The server 525 servers the web pages to the web browser 515 for display to the user. The script GUI module 530 also parses the information received from the script 537 to determine the presence of an input command and any possible input values. Whenever the script 537 stops for input, the script GUI module generates a web page containing an input mechanism (e.g., web form) through which the user can enter or select an appropriate input value. In response to an input value returned by the web browser 515, the script GUI module 530 determines the input value and sends it to the script 537.

In one implementation, the script GUI module 530 determines a prompt type command by parsing information, received from the script, for the presence of tag (e.g., simple parser). The tag comprises a predefined string inserted, appended or the like to the prompt type command. In another implementation, the script GUI module 530 determines an input type command by parsing information received from the script such that each element of the script is interpreted (e.g., full parser).

Accordingly, the script GUI module 530 receives communications from the web server 525 to the script 537, and also from the script 537 to the web server 525. If the script 537 is writing information, the information is encoded as HTML. The HTML page specifies the page layout that will be returned to the web browser. If the interactive script 537 is asking for user input (e.g., prompt type command), the script GUI module 530 generate an HTML form containing an applicable question along with an input mechanism in which the user can specify or select an in put. Depending upon the types of input requested, the script GUI module 530 may generate different types of input mechanisms. The input mechanisms may include, but are not limited to, a text box or a select list. In addition, the script GUI module may also generate auto-fill values (e.g., default value), check the validity of an input value, and or the like.

It should be appreciated that the script GUI module 530 receives all communication between the web browser 525 and the given script 537. Therefore, it is possible to restrict access to the particular script 535-539 executing on the server device 520. In such a case, the script GUI module 530 first checks if the user is authorized to invoke the given script 537 or not. If the script GUI module 530 is capable of restricting access to the scripts 535-539, an audit trail of all script 535-539 execution may readily be maintained.

Figure 6:
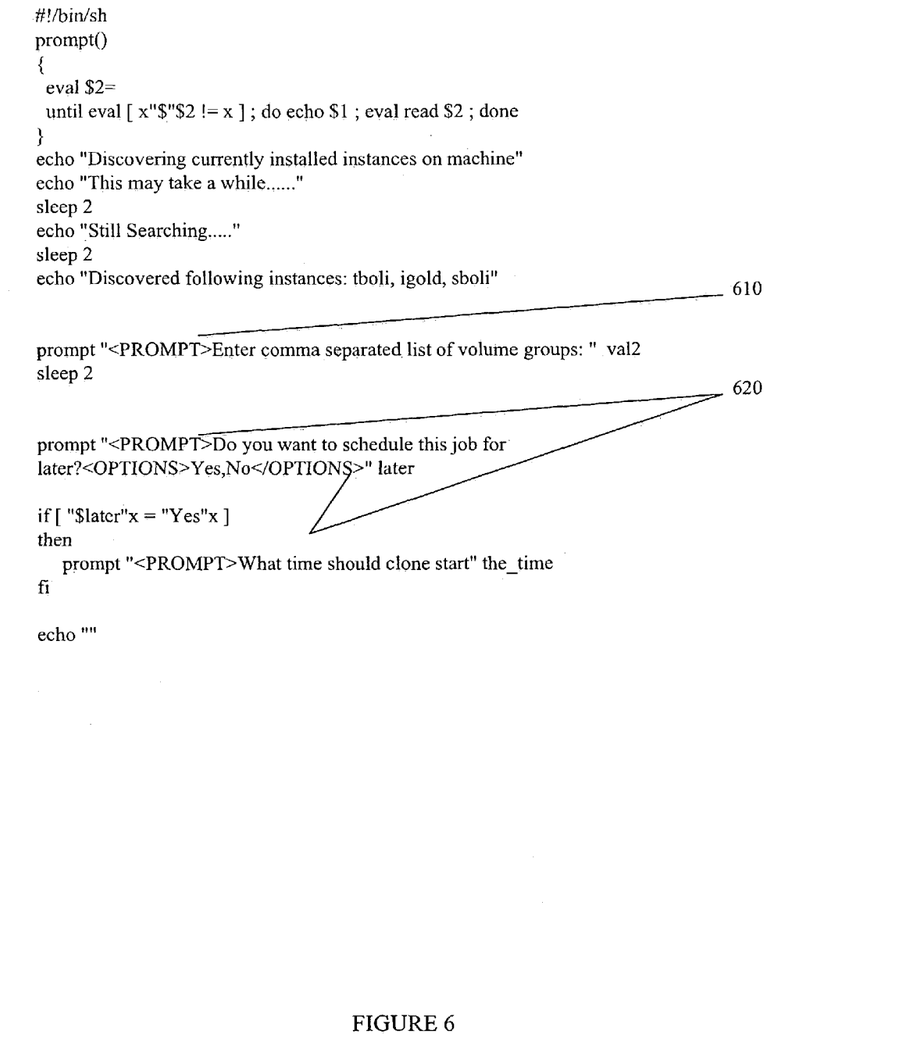
FIG. 6 shows an exemplary script configured for use with a system for providing a GUI, in accordance with another embodiment of the present invention.

Referring now to FIG. 6, an exemplary script configured for use with a system for providing a GUI, in accordance with another embodiment of the present invention, is shown. As depicted in FIG. 6, each input type command (e.g., prompt) is identified and a tag is placed in each input type command. The tag may indicate a free-text type input command 610, an option type input command 620, and/or the like.

Figure 7A:
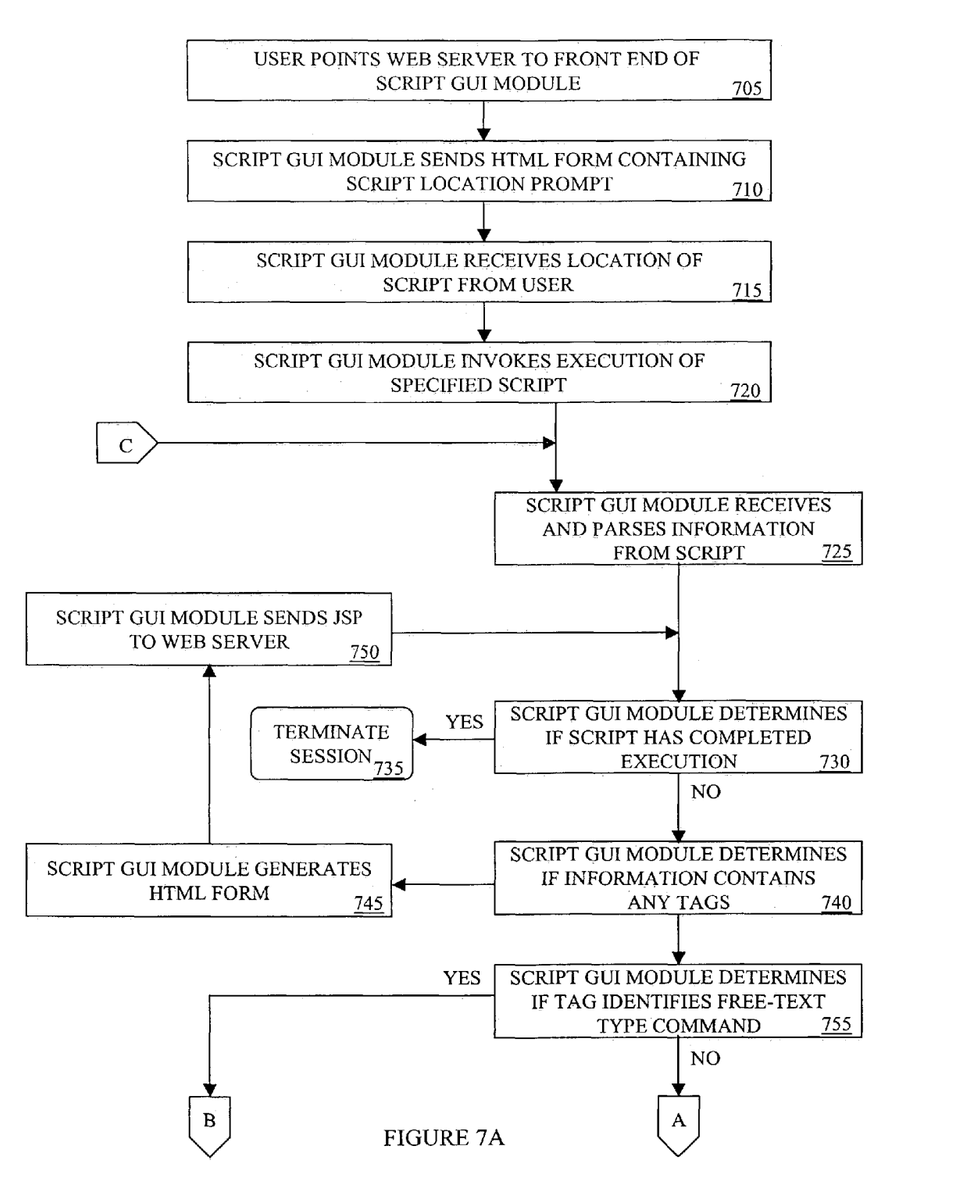
FIGS. 7A-7B shows a flow diagram of a method of providing a GUI for a script, in accordance with one embodiment of the present invention.
Figure 7B:
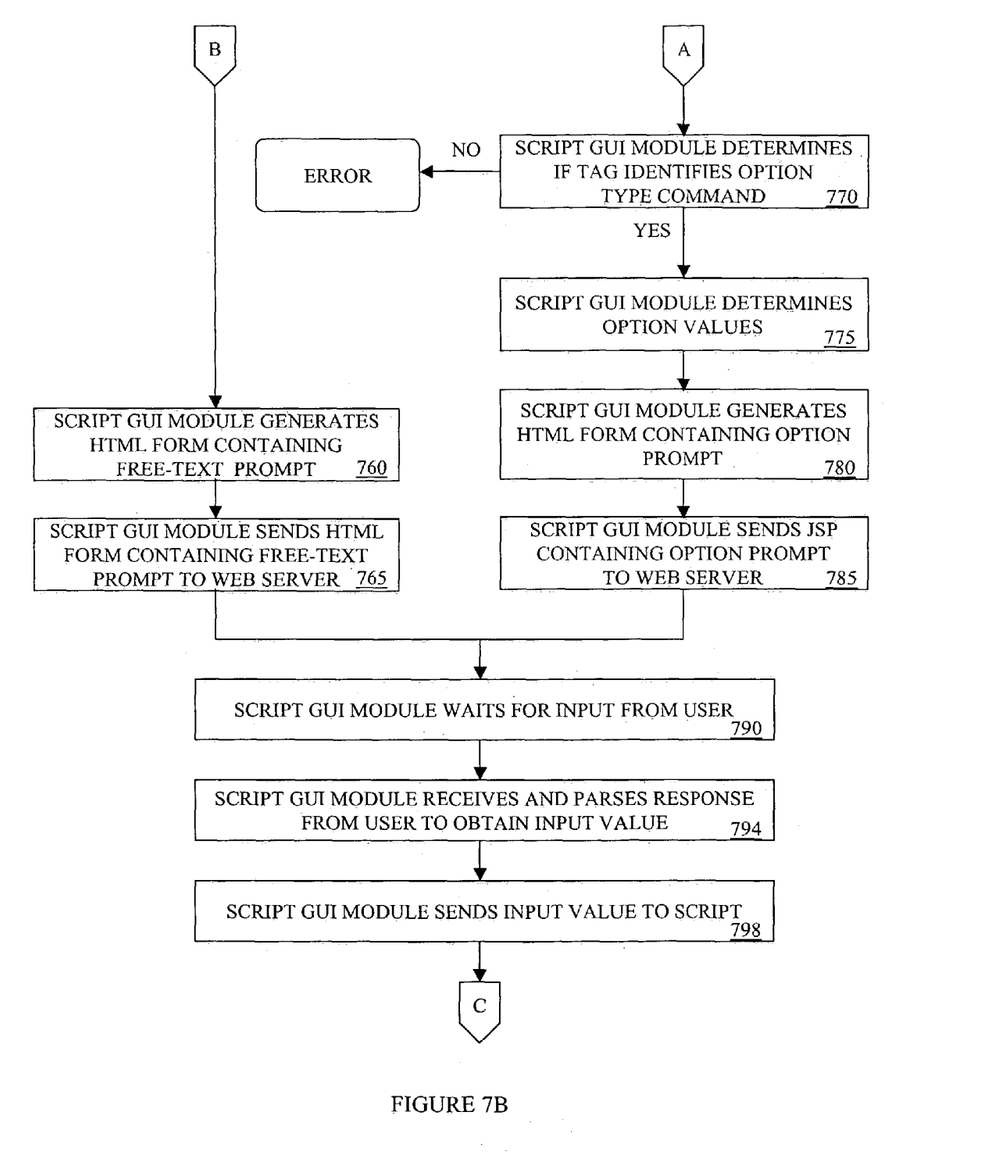

Referring now to FIGS. 7A-7B, a flow diagram of a method of providing a GUI for a script, in accordance with one embodiment of the present invention, is shown. As depicted in FIGS. 7A-7B, the method begins with a user pointing a web server to a script GUI module, at 705. The script GUI module returns an HTML form comprising an appropriate character string and an input mechanism. The input mechanism may comprise a free-text prompt (e.g. text entry box) for entering the location of a script, at 710.

At 715, the script GUI module receives information, containing the location of the script, from web server. At 720, the script GUI module invokes execution of the specified script.

At step 725, the script GUI module receives and parses information from the executing script. At 730, the script GUI module determines if execution of the script has been completed. If execution of the script has been completed, the script GUI module terminates the session, at step 735.

If the script is executing, the script GUI module determines if the information contains one or more tags, at 740. If the information does not contain a tag, the script GUI module generates a JSP containing the information from script to be displayed to the user, at 745. At 750, the script GUI module sends the JSP to the web server. After the JSP is sent to the web server, operation returns to step 730.

If the script contains a tag, the script GUI module determines if the tag identifies a free-text type input command, at step 755. If the tag identifies a free-text type input command, the script GUI module generates an HTML form containing a free-text prompt, at step 760. At step 765, the script GUI module sends the HTML form containing the free-text prompt to the web server.

If the tag does not identify a free-text type input command, the script GUI module determines if the tag identifies an option type command, at step 770. If the tag identifies an option type command, the script GUI module determines the option values from the list of value (e.g., comma-separated list) in a corresponding statement of the script, at step 775. At step 760, the script GUI module generates an HTML form containing an option prompt (e.g., select box) with applicable option values. At step 785, the script GUI module sends the HTML form containing the option prompt with applicable option values to the web server.

If an HTML form containing a free-text prompt, in accordance with step 765, or an option prompt, in accordance with step 785, is sent by the script GUI module to the web server, the script GUI module waits for a response from the user (e.g., web server), at step 790. At step 795, the script GUI module receives and parses the response, received by the web server from the web browser, to determine a specified input value from the user. At step 795, the script GUI module sends the specified input value to the script. Upon sending the specified input value to the script, operation returns to step 725.

Figure 8:
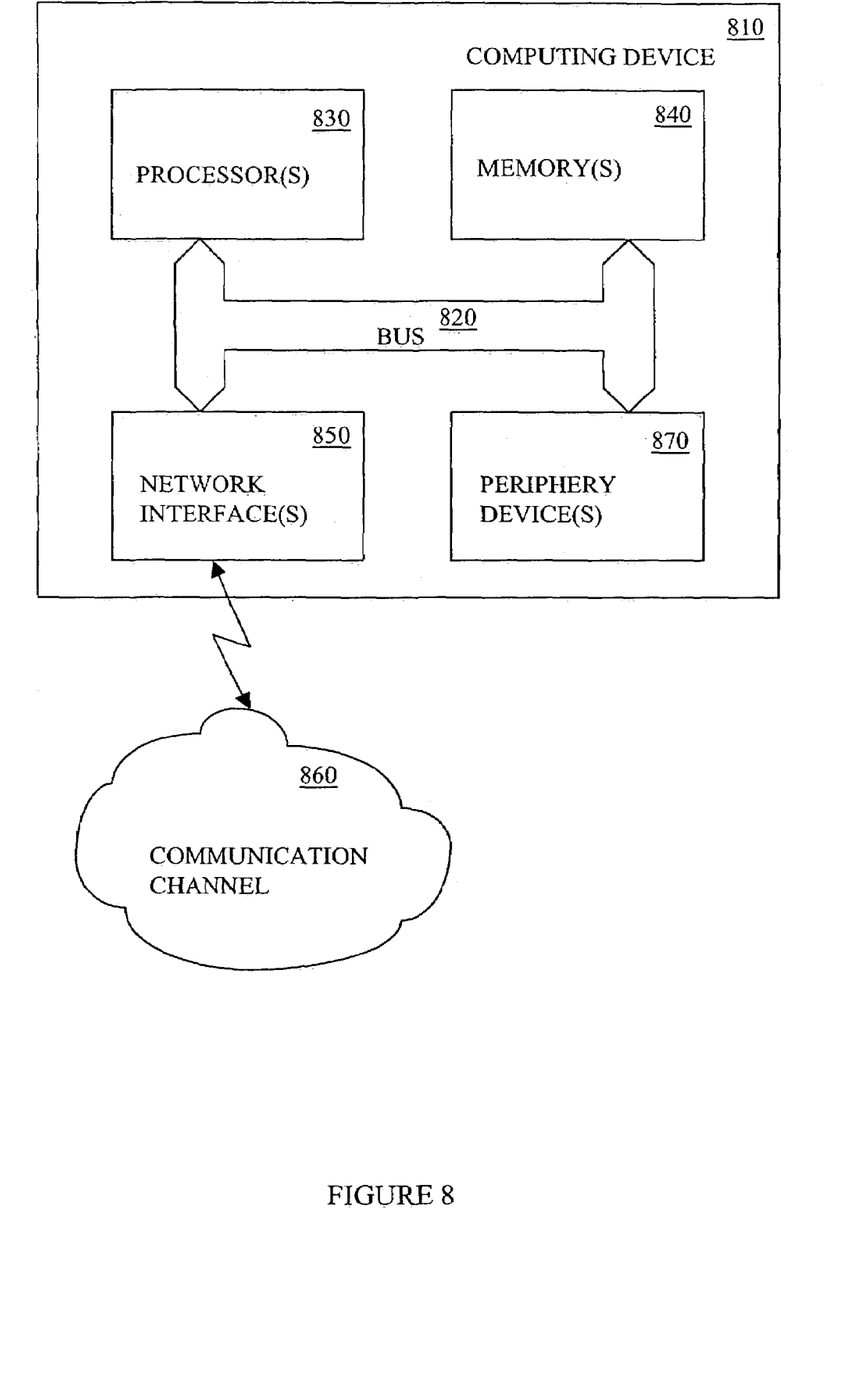
FIG. 8 shows a block diagram of an exemplary computing device, for performing embodiments of the present invention.

Referring now to FIG. 8, a block diagram of an exemplary computing device 810, for performing embodiments of the present invention, is shown. Although the computing device 810 is shown as a stand-alone system, it is also appreciated that the computing system can readily be implemented as a distributed computing system. An exemplary distributed computing system may comprise, for example but not limited to, a first computing device which implements an interface unit such as a web browser. The distributed computer system may also comprise a second computing device which implements a script GUI module, a shell and one or more scripts. In another implementation, the second computing device may implement a web server, a script GUI module, a shell and one or more scripts. In yet another implementation, a third computing device may implement the web server.

As depicted in FIG. 8, the exemplary computing device 810 comprises an address/data bus 820 for communicating information and instructions. One or more processors 830 are coupled with the bus 820 for processing information and instructions.

One or more memories 840 are also coupled to the bus 820 for storing information and instructions for the processor(s) 830. The memory 840 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like.

One or more network interface(s) 850 are also coupled to the bus 820. The network interface 850 provides for communicating with other computing devices across one or more communication channels 860. The other computing devices may comprise a client device, a personal computer, a network computer, a thin client, a personal digital assistant, a web enabled device, a server device and/or the like, Optionally, the exemplary computing device 810 may further comprise one or more peripheral devices 870 (e.g., mass data storage device, display, keyboard, pointing device, speaker, and the like) coupled to the bus 820. The peripheral devices 870 may provide for inputting and output information and instructions.

Certain elements of the present invention are realized as software code that reside on a computer-readable medium such as the memory 840, and are executed by the processor 830. When executed, the software code causes the processor 830 to implement a script GUI module. The script GUI module comprises a means for invoking a script. The script GUI module further comprises a means for establishing a communication link between an interface unit and itself, and a communication link between itself and the invoked script. The script GUI module further comprises a means for parsing information from the script to determine an input command. The GUI module further comprises a means for generating and displaying an input mechanism appropriate for the particular input command.

The software code also causes the processor 830 to implement a means for executing one or more scripts and a means for communicating over a network. The means for communicating over a network may comprise a web server.

Accordingly, embodiments of the present invention advantageously pass information utilizing a GUI between the user and the script that otherwise does not have one. Embodiments of the present invention also advantageously provide a GUI for shell scripts with minimal or no modification to the scripts. Embodiments of the present invention also advantageously provide a GUI for scripts without the need for re-generating, re-compiling or other tasks for each script.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for generating a graphical user interface for a script session comprising:
    a script having a command line interface; and
    a script graphical user interface module, communicatively coupled to said script, for parsing information received from execution of said script to determine an input type command and generating an appropriate graphical input mechanism for said command line interface as a function of said input type command.

2. The system for generating a graphical user interface for a script session according to claim 1, further comprising an interface unit for presenting said appropriate input mechanism to a user.

3. The system for generating a graphical user interface for a script session according to claim 1, further comprising a shell for executing said script.

4. The system for generating a graphical user interface for a script session according to claim 3, further comprising a computing device for implementing said shell and said script graphical user interface.

5. The system for generating a graphical user interface for a script session according to claim 3, further comprising a server device for implementing said shell and said script graphical user interface module.

6. A method of generating a graphical user interface for a script session comprising:
    receiving information from a script having a first command line interface;
    parsing said information;
    determining if said information comprises an input command; and
    generating a first graphical user interface comprising an input prompt for said first command line interface.

7. The method according to claim 6, further comprising:
    generating a second graphical user interface comprising a prompt for specifying a location of said script; and
    invoking execution of said script.

8. The method according to claim 6, wherein determining if said information comprises an input command comprises determining if said information comprises a tag.

9. The method according to claim 8, further comprises:
    determining if said tag identifies a free-text type input command; and
    determining is said tag identifies an option type input command.

10. The method according to claim 9, wherein generating a first graphical user interface comprises generating said first graphic user interface comprising a first character string and a text box if said tag identifies a free-text type input command.

11. The method according to claim 9, further comprising determining a plurality of input values if said tag identifies an option type input command.

12. The method according to claim 11, wherein generating a first graphical user interface comprising an input prompt comprises generating said first graphic user interface comprising a second character string and a selection box comprising said plurality of input values if said tag identifies an option type input command.

13. The method according to claim 6, further comprising sending said first graphic user interface to a graphics display unit.

14. The method according to claim 13, further comprising:
    receiving a response from said graphics display unit;
    parsing said response to determine a user specified input value; and
    sending said specified input value to said script.

15. A computing device for generating a graphical user interface for a script session comprising:
    a bus;
    a memory unit, coupled to said bus, for storing software code; and
    a processor, coupled to said bus, for executing said software code, wherein execution of said software code implements:
        a script having a command line interface;
        a script graphical user interface module, communicatively coupled to said script, for parsing information received from execution of said script to determine an input type command and generating a first Java server page comprising a prompt corresponding to said input type command; and
        a web server, communicatively coupled to said script graphical user interface module, for serving said Java server page to a web browser.

16. The computing device for generating a graphical user interface for a script session according to claim 15, further comprising a shell for executing said script.

17. The computing device for generating a graphical user interface for a script session according to claim 15, wherein said script graphical user interface module generates a second Java server page comprising a prompt for specifying a location of said script.

18. The computing device for generating a graphical user interface for a script session according to claim 17, wherein said script graphical user interface module establishes a first communication link between said script graphical user interface module and said script.

19. The computing device for generating a graphical user interface for a script session according to claim 18, wherein said script graphical user interface module establishes a second communication link between said script graphical user interface module and said web server.

20. The computing device for generating a graphical user interface for a script session according to claim 19, wherein said script user interface module:
    determines if a user has authorization to invoke said script;
    invokes execution of said script at said location if said user has authorization to invoke said script; and
    denies access to said scrip if said user does not have authorization to invoke said script.

21. The computing device for generating a graphical user interface for a script session according to claim 20, wherein said script user interface module generates an audit trail of said script.

22. The computing device for generating a graphical user interface for a script session according to claim 17, wherein said script graphical user interface module invokes execution of said script at said location.

23. A computer-readable medium containing software code which when executed by a computing device cause the computing device to implement a method of generating a graphical user interface for a script session, comprising:
    receiving information from a script having a command line interface;
    parsing said information from said script;

determining if said information comprises a tag; and generating a first graphical user interface corresponding to said command line interface comprising an input prompt when said information comprises a tag.

24. The method according to claim 23, further comprising:

generating a second graphical user interface comprising a prompt for specifying a location of said script; and invoking execution of said script.

25. The method according to claim 23, further comprises:

determining if said tag identifies a free-text type input command;

determining if said tag identifies an option type input command.

26. The method according to claim 25, wherein generating a first graphical user interface comprises generating said first graphic user interface comprising a first character string and a text box if said tag identifies a free-text type input command.

27. The method according to claim 25, further comprising determining a plurality of input values if said tag identifies an option type input command.

28. The method according to claim 27, wherein generating a first graphical user interface comprises generating said first graphic user interface comprising a second character string and a selection box comprising said plurality of input values if said tag identifies an option type input command.

29. The method according to claim 23, further comprising serving first graphic user interface to a web browser.

30. The method according to claim 29, further comprising:

receiving a response from said web browser;

parsing said response to determine a user specified input value; and sending said specified input value to said script.

* * * * *

UNITED STATES PATENT AND TRADEMARK OFFICE
CERTIFICATE OF CORRECTION

| | | |
|---|---|---|
| PATENT NO. | : 7,421,658 B1 | Page 1 of 1 |
| APPLICATION NO. | : 10/631339 | |
| DATED | : September 2, 2008 | |
| INVENTOR(S) | : Sharma et al. | |

It is certified that error appears in the above-identified patent and that said Letters Patent is hereby corrected as shown below:

On sheet 1 of 8, in Figure 2, line 2, delete "MENUES" and insert -- MENUS --, therefor.

On sheet 3 of 8, in Figure 4C, line 1, delete "4425" and insert -- 445 --, therefor.

On sheet 3 of 8, in Figure 4C, Ref. Numeral 440, line 1, delete "INSTACHES" and insert -- INSTANCES --, therefor.

On sheet 3 of 8, in Figure 4C, Ref. Numeral 4425, delete "ANT" and insert -- WANT --, therefor.

In column 4, line 60, delete "and or" and insert -- and/or --, therefor.

In column 6, line 29, delete "like," and insert -- like. --, therefor.

In column 8, line 51, in claim 20, delete "scrip" and insert -- script --, therefor.

Signed and Sealed this

Sixteenth Day of March, 2010

David J. Kappos
*Director of the United States Patent and Trademark Office*